United States Patent
Sasai et al.

(10) Patent No.: US 11,901,953 B2
(45) Date of Patent: Feb. 13, 2024

(54) OPTICAL TRANSMISSION SYSTEM AND CHARACTERISTIC ESTIMATION METHOD

(71) Applicant: NIPPON TELEGRAPH AND TELEPHONE CORPORATION, Tokyo (JP)

(72) Inventors: Takeo Sasai, Musashino (JP); Masanori Nakamura, Musashino (JP); Asuka Matsushita, Musashino (JP); Yoshiaki Kisaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/915,002

(22) PCT Filed: Mar. 31, 2020

(86) PCT No.: PCT/JP2020/014894
§ 371 (c)(1),
(2) Date: Sep. 27, 2022

(87) PCT Pub. No.: WO2021/199317
PCT Pub. Date: Oct. 7, 2021

(65) Prior Publication Data
US 2023/0106338 A1 Apr. 6, 2023

(51) Int. Cl.
*H04B 10/06* (2006.01)
*H04B 10/61* (2013.01)
*H04B 10/58* (2013.01)

(52) U.S. Cl.
CPC ......... *H04B 10/6162* (2013.01); *H04B 10/58* (2013.01)

(58) Field of Classification Search
CPC .......................... H04B 10/6162; H04B 10/58; H04B 10/6161; H04B 10/6163; H04B 10/6164;
(Continued)

(56) References Cited

U.S. PATENT DOCUMENTS

| 9,923,640 | B2 * | 3/2018 | Okabe | H04B 10/07953 |
| 2014/0356003 | A1 * | 12/2014 | Randel | H04B 10/616 398/208 |
| 2016/0241341 | A1 * | 8/2016 | Endo | H04J 14/02 |

OTHER PUBLICATIONS

Asuka Matsushita et al., High-Spectral-Efficiency 600-Gbps/Carrier Transmission Using PDM-256QAM Format, Journal of Lightwave Technology, vol. 37, No. 2, 2019.
(Continued)

*Primary Examiner* — Hanh Phan
(74) *Attorney, Agent, or Firm* — Harness, Dickey & Pierce, P.L.C.

(57) ABSTRACT

An optical transmission system, in which an optical transmission apparatus and an optical reception apparatus are provided, includes a coefficient determination unit configured to optimize, based on a reception signal received by the optical reception apparatus, a coefficient to be used to compensate for deterioration according to characteristics of each device configuring a transmission path between the optical transmission apparatus and the optical reception apparatus, and a device characteristic estimation unit configured to estimate the characteristics of each device by using the optimized coefficient.

15 Claims, 10 Drawing Sheets

(58) Field of Classification Search
CPC .......... H04B 10/6165; H04B 10/2507; H04B 10/0795; H04B 10/07953; H04B 10/07957; H04B 10/616; H04B 10/612; H04B 10/613
USPC ....... 398/202, 208, 209, 210, 212, 213, 214, 398/135, 136, 137, 138, 139, 158, 159, 398/148, 81, 33, 38, 25, 26, 27, 183, 188, 398/194, 195
See application file for complete search history.

(56) References Cited

OTHER PUBLICATIONS

Takahito Tanimura et al., Experimental Demonstration of a Coherent Receiver that Visualizes Longitudinal Signal Power Profile over Multiple Spans out of Its Incoming Signal, ECOC2019, Sep. 22, 2019.

* cited by examiner

OPTICAL TRANSMISSION SYSTEM AND CHARACTERISTIC ESTIMATION METHOD

CROSS-REFERENCE TO RELATED APPLICATIONS

This application is a 371 U.S. National Phase of International Application No. PCT/JP2020/014894, filed on Mar. 31, 2020. The entire disclosure of the above application is incorporated herein by reference.

TECHNICAL FIELD

The present invention relates to an optical transmission system and a characteristic estimation method.

BACKGROUND ART

In long-distance fiber optics transmission using an optical transmission apparatus and an optical reception apparatus, there are various devices configuring a transmission path between the optical transmission apparatus and the optical reception apparatus. Here, the devices configuring the transmission path include devices that perform transmission processing in the optical transmission apparatus (hereinafter, referred to as "transmission side devices"), optical fibers, and devices that perform reception processing in the optical reception apparatus (hereinafter, referred to as "reception side devices").

The transmission side devices include, for example, DACs (digital-to-analog converters), driver amplifiers, modulators, and lasers. The reception side devices include, for example, 90° hybrid circuits, photodiodes, TIAs (trans impedance amplifiers) and ADCs (analog-to-digital converters).

These devices have device-specific linear response characteristics such as frequency characteristics and nonlinear response characteristics such as signal voltage saturation characteristics (see, Non-Patent Literatures 1 and 2, for example). These characteristics limit the signal quality of the optical transmission system. In order to compensate for deterioration of transmission signals according to the above-described device-specific characteristics, it is necessary to estimate the linear and nonlinear response characteristics. The linear and nonlinear responses vary greatly depending on individual, environment, and parameters of each device. Therefore, it is desirable to estimate the linear and nonlinear response characteristics for each system and compensate for the deterioration.

CITATION LIST

Non-Patent Literature

Non-Patent Literature 1: A. Matsushita et al., "High-Spectral-Efficiency 600-Gbps/Carrier Transmission Using PDM-256QAM Format", Journal of Lightwave Technology, 37(2), 2019.

Non-Patent Literature 2: T. Tanimura et al., "Experimental Demonstration of a Coherent Receiver that Visualizes Longitudinal Signal Power Profile over Multiple Spans out of Its Incoming Signal", ECOC2019 PD.3.4, 2019.

SUMMARY OF THE INVENTION

Technical Problem

However, when each of the above-described devices is once incorporated into an optical transmission apparatus or an optical reception apparatus, a problem of the difficulty in estimating response characteristics of individual devices arises.

In view of the above circumstances, the present invention intends to provide a technique capable of easily estimating response characteristics of each device configuring a transmission path between the optical transmission apparatus and the optical reception apparatus.

Means for Solving the Problem

An aspect of the present invention is an optical transmission system including an optical transmission apparatus and an optical reception apparatus. The optical transmission system includes a coefficient determination unit configured to optimize, based on a reception signal received by the optical reception apparatus, a coefficient to be used to compensate for deterioration according to characteristics of each device configuring a transmission path between the optical transmission apparatus and the optical reception apparatus, and a device characteristic estimation unit configured to estimate the characteristics of each device by using the optimized coefficient.

An aspect of the present invention is a characteristic estimation method for an optical transmission system including an optical transmission apparatus and an optical reception apparatus. The characteristic estimation method includes a coefficient updating step of optimizing, based on a reception signal received by the optical reception apparatus, a coefficient to be used to compensate for deterioration according to characteristics of each device configuring a transmission path between the optical transmission apparatus and the optical reception apparatus, and a device characteristic estimation step of estimating the characteristics of each device by using the optimized coefficient.

Effects of the Invention

The present invention makes it possible to easily estimate response characteristics of each device configuring a transmission path between an optical transmission apparatus and an optical reception apparatus.

DESCRIPTION OF EMBODIMENTS

Hereinafter, embodiments of the present invention will be described with reference to the drawings.

First Embodiment

Figure 1:
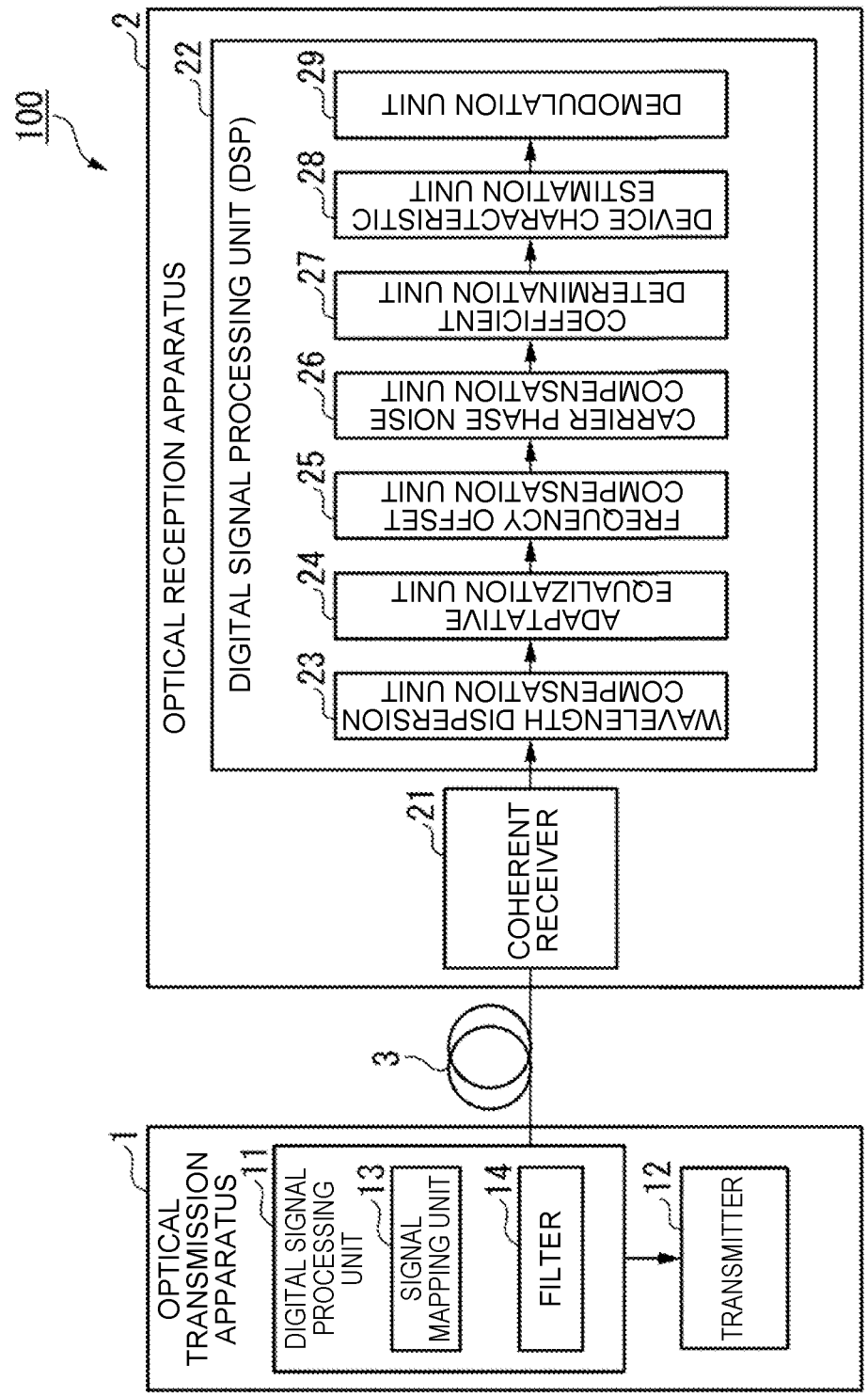
FIG. 1 is a diagram illustrating a system configuration of an optical transmission system according to a first embodiment.

FIG. 1 is a diagram illustrating a system configuration of an optical transmission system 100 according to the first embodiment. The optical transmission system 100 includes an optical transmission apparatus 1 and an optical reception apparatus 2. The optical transmission apparatus 1 and the optical reception apparatus 2 are communicably connected via an optical transmission path 3. The optical transmission path 3 transmits, to the optical reception apparatus 2, optical signals transmitted by the optical transmission apparatus 1. The optical transmission path 3 is configured by an optical fiber that connects the optical transmission apparatus 1 and the optical reception apparatus 2.

In the first embodiment, an exemplary configuration in which the optical reception apparatus 2 estimates characteristics of each device configuring the transmission path between the optical transmission apparatus 1 and the optical reception apparatus 2 (hereinafter, referred to as "constituent device") and compensates for device response based on the estimated characteristics of the constituent device will be described. In the present invention, the constituent devices are transmission side devices, the optical fiber, and reception side devices. Further, the transmission side devices include, for example, DACs, driver amplifiers, modulators, and lasers. The reception side devices include, for example, 90° hybrid circuits, photodiodes, TIAs, and ADCs. However, the transmission side devices and the reception side devices are not limited to the above-described examples.

The devices, device characteristics of which can be estimated by the present invention, include DACs, driver amplifiers, modulators and lasers, multi/demultiplexers, optical amplifiers, fibers, optical filters, 90° hybrid circuits, photodiodes, TIAs and ADCs. In the DACs (digital-to-analog converters), frequency characteristics are device characteristics that can be estimated. In the driver amplifier, frequency characteristics and output saturation characteristics are device characteristics that can be estimated. In the modulators, frequency characteristics, IQ imbalance, IQ skew, extinction ratio deviation, bias deviation, and the like are device characteristics that can be estimated. In the lasers, frequency offset is a device characteristic that can be estimated.

In the multi/demultiplexers, filter central frequency deviation and filter shape are device characteristics that can be estimated. In the optical amplifiers, tilt is a device characteristic that can be estimated. In the fibers, dispersion value, loss value, nonlinear phase rotation amount, and the like are device characteristics that can be estimated. In the optical filters, filter central frequency deviation and filter shape are device characteristics that can be estimated. In the 90° hybrid circuits, extinction ratio deviation of a polarization light splitter is a device characteristic that can be estimated. In the photodiodes, frequency characteristics, output saturation characteristics, unbalance of balanced PD, and the like are device characteristics that can be estimated. In the TIAs, frequency characteristics, output saturation characteristics, gain change due to heat, lane tube gain imbalance, and the like are device characteristics that can be estimated. In the ADCs, frequency characteristics are device characteristics that can be estimated.

The optical transmission apparatus 1 includes a digital signal processing unit 11 and a transmitter 12.

The digital signal processing unit 11 is configured by a signal mapping unit 13 and a filter 14. The signal mapping unit 13 generates an electric signal by mapping transmission information given from an external information source. The filter 14 filters the generated electric signal. The filter 14 is, for example, a Nyquist filter.

The transmitter 12 converts the electric signal generated by the digital signal processing unit 11 into an optical signal and transmits it to the optical reception apparatus 2 via the optical transmission path 3. Devices provided in the transmitter 12 include a DAC, a driver amplifier, a modulator, a laser, and the like. That is, the transmitter 12 corresponds to a transmission side device. The transmitter 12 uses a modulation method of QPSK (Quadrature Phase Shift Keying), for example.

The optical reception apparatus 2 includes a coherent receiver 21 and a digital signal processing unit 22.

The coherent receiver 21 receives optical signals transmitted from the optical transmission apparatus 1. Devices provided in the coherent receiver 21 include a 90° hybrid circuit, a photodiode, a TIA, an ADC, and the like. That is, the coherent receiver 21 corresponds to a reception side device. The coherent receiver 21 separates a baseband optical signal into two optical signals having planes of polarization orthogonal to each other. A set of output lights can be obtained by inputting these optical signals and local light of a local light source (not illustrated) input to the 90° hybrid circuit (not illustrated) and causing both lights to interfere with each other in phase and opposite phase. Further, a set of output lights can be obtained by orthogonal (90°) and inverse orthogonal)(−90° interference. Thus, a total of four output lights can be obtained. These output lights are converted from the optical signals into analog electric signals by the photodiode (not illustrated). The TIA performs impedance conversion on these analog electric signals and then amplifies and outputs them to the ADC. The ADC converts these analog signals into digital signals.

When an optical signal propagates through the optical transmission path 3, the phase of the signal rotates in proportion to the optical power of the signal. Due to such nonlinear optical effects, a distortion in signal waveform occurs. The digital signal processing unit 22 captures, as reception signals, digital signals output by the coherent receiver 21, and performs various compensations for the captured reception signals.

The digital signal processing unit 22 includes a wavelength dispersion compensation unit 23, an adaptive equalization unit 24, a frequency offset compensation unit 25, a carrier phase noise compensation unit 26, a coefficient determination unit 27, a device characteristic estimation unit 28, and a demodulation unit 29.

The wavelength dispersion compensation unit 23 compensates for wavelength dispersion in input digital signals, which have been generated in the optical transmission path 3.

The adaptive equalization unit 24 compensates for distortion in waveform of optical signals in the optical transmission path 3. That is, the adaptive equalization unit 24 corrects code errors generated in optical signals due to inter-symbol interference in the optical transmission path 3. The adaptive equalization unit 24 executes adaptive equalization processing with an FIR filter (finite impulse response filter) according to a tap coefficient having been set.

The frequency offset compensation unit 25 executes frequency offset compensation processing for the four digital signals subjected to the adaptive equalization processing.

The carrier phase noise compensation unit 26 executes phase offset compensation processing for the four digital signals that have been compensated in frequency offset.

Figure 2:
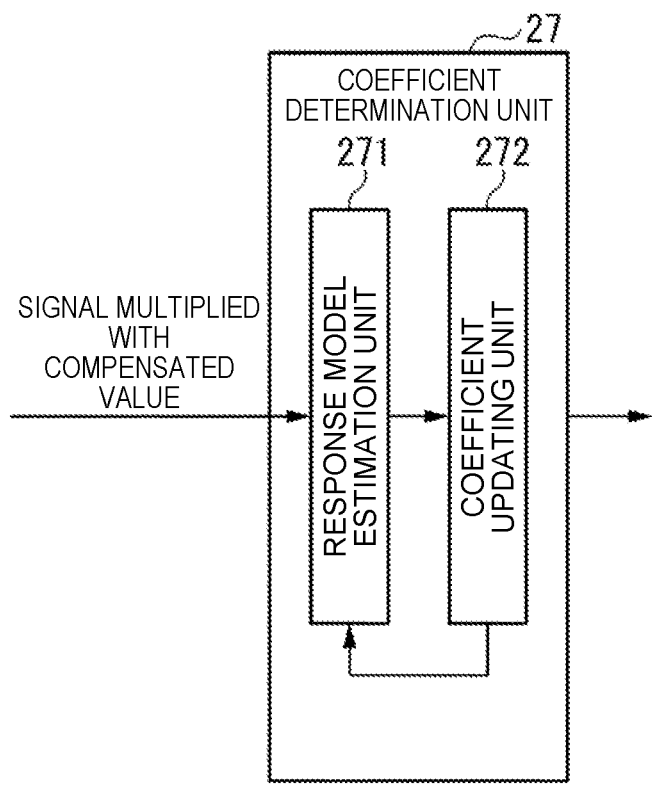
FIG. 2 is a diagram illustrating an internal configuration of a coefficient determination unit according to the first embodiment.

The coefficient determination unit 27 optimizes, based on a reception signal received by the optical reception apparatus 2, coefficients to be used to compensate for deterioration according to characteristics of respective constituent devices configuring the transmission path. The coefficient determination unit 27 is configured, as illustrated in FIG. 2, by a response model estimation unit 271 and a coefficient updating unit 272. FIG. 2 is a diagram illustrating an internal configuration of the coefficient determination unit 27 according to the first embodiment.

The response model estimation unit 271 estimates forward characteristic response models of linear response and nonlinear response, for each constituent device, based on the reception signal. Here, the forward characteristic response models of linear response and nonlinear response are models representing linear and nonlinear response characteristics. Next, using the forward characteristic response models, the response model estimation unit 271 estimates inverse characteristic response models. Here, the inverse characteristic response models are models representing inverse characteristics of the forward characteristics of the constituent devices indicated by the forward characteristic response models.

First of all, in order for the coefficient determination unit 27 to perform the above processing, it is necessary for the response model estimation unit 271 to perform synchronization using the compensated digital signal. Subsequently, the response model estimation unit 271 gives the wavelength dispersion, distortion, frequency offset, and phase offset for the amount compensated in the previous stage to the synchronized digital signal. For example, the response model estimation unit 271 multiplies the synchronized digital signal with the wavelength dispersion, distortion, frequency offset, and phase offset for the amount compensated in the previous stage. As a result, using the synchronized digital signal, the response model estimation unit 271 generates a simulated reception signal. The simulated reception signal is not the reception signal itself input to the wavelength dispersion compensation unit 23, but a signal assumed to be the reception signal input to the wavelength dispersion compensation unit 23. Then, the response model estimation unit 271 uses the generated simulated reception signal to estimate the forward characteristic response models and the inverse characteristic response models.

The coefficient updating unit 272 optimizes the coefficients in such a manner that the evaluation function relating to an output signal obtained by using the inverse characteristic response models and the simulated reception signal becomes equal to or greater than a predetermined threshold. For example, the coefficient updating unit 272 creates the evaluation function by comparing the output signal with a predetermined signal transmitted by the optical transmission apparatus 1, and optimizes the coefficients by updating the coefficients so as to minimize the evaluation function. Here, the predetermined signal transmitted by the optical transmission apparatus 1 is a training signal. The coefficient updating unit 272 acquires the output signal by giving inverse characteristics of linear response and nonlinear response of respective constituent devices represented by the inverse characteristic response models to the simulated reception signal.

Using the optimized coefficients, the device characteristic estimation unit 28 estimates the inverse characteristics of linear response and nonlinear response of respective constituent devices. The inverse characteristics of linear response and nonlinear response of respective constituent devices estimated by the device characteristic estimation unit 28 have inverse characteristics of the forward characteristics of linear response and nonlinear response of respective constituent devices. The device characteristic estimation unit 28 compensates for the device response by giving the inverse characteristics of linear response and nonlinear response of respective constituent devices to the simulated reception signal output from the coefficient determination unit 27.

The demodulation unit 29 acquires a demodulation signal by demodulating and decoding the digital signal output from the device characteristic estimation unit 28.

Figure 3:
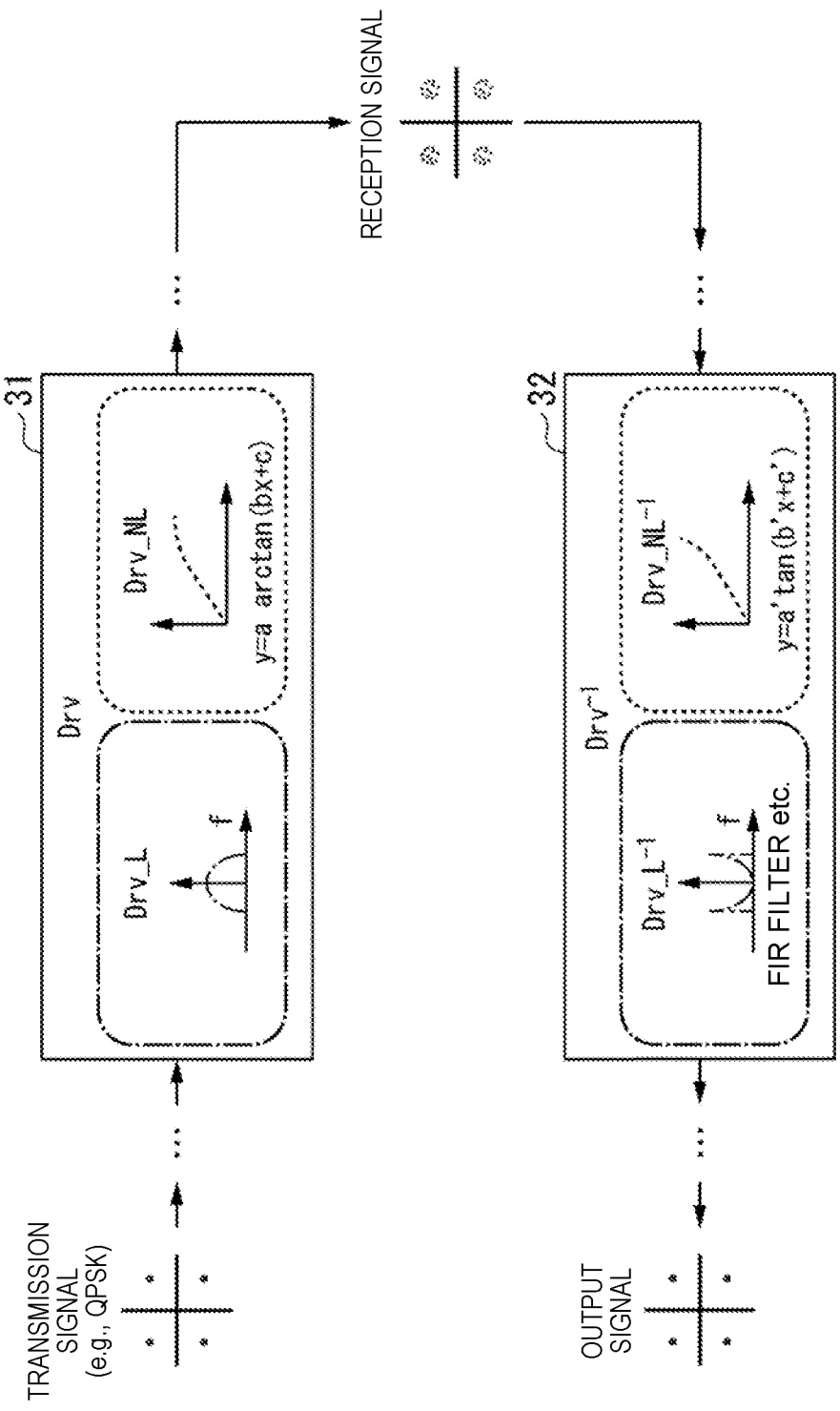
FIG. 3 is a diagram illustrating an exemplary inverse characteristic response model that is estimated by a response model estimation unit according to the first embodiment.
Figure 4:
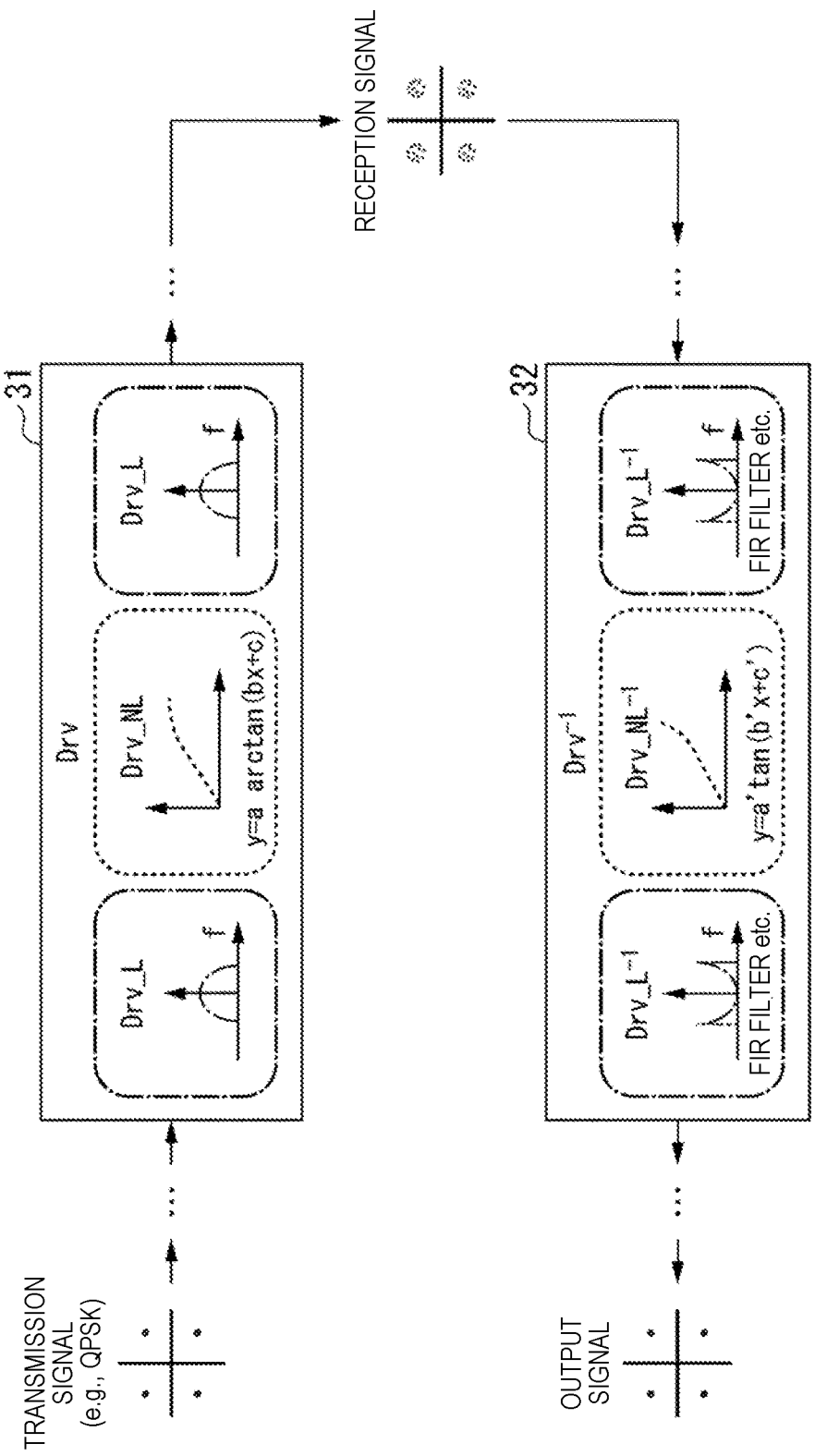
FIG. 4 is a diagram illustrating an exemplary inverse characteristic response model that is estimated by the response model estimation unit according to the first embodiment.

FIGS. 3 and 4 are diagrams illustrating exemplary inverse characteristic response models that the response model estimation unit according to the first embodiment estimates.

First, the example of FIG. 3 will be described. The upper part of FIG. 3 illustrates an exemplary forward characteristic response model 31, and the lower part of FIG. 3 illustrates an exemplary inverse characteristic response model 32. The forward characteristic response model 31 and the inverse characteristic response model 32 are estimated for each constituent device. The example illustrated in FIG. 3 as a constituent device is a single driver amplifier. It is assumed that the forward characteristic response model 31 of the driver amplifier is represented by a series connection of a band limiting filter representing a linear response and arctan representing a nonlinear response. In this case, the inverse characteristic of the forward characteristic response model 31 can be simulated by a series connection of "FIR filter that emphasizes high frequencies" and "tan", as the inverse characteristic response model 32 of the driver amplifier. The response model estimation unit 271 performs this processing based on the simulated reception signal.

If a tan coefficient and a filter tap coefficient can be set so as to have inverse characteristics of the forward characteristics, the SNR (signal-to-noise ratio) of the output signal can be increased. Conversely, by optimizing the tan coefficient and the filter tap coefficient so as to increase the SNR of the output signal, the inverse characteristic of the constituent device can be estimated. Therefore, the optical reception apparatus 2 according to the present invention acquires the output signal by using the inverse characteristic response model 32 estimated based on the simulated reception signal. Then, the optical reception apparatus 2 optimizes the coefficients (the tan coefficient and the filter tap coefficient in the case of FIG. 3) so that the evaluation function relating to the acquired output signal becomes equal to or greater than a predetermined threshold.

Further, the forward characteristic response model 31 and the inverse characteristic response model 32 are not necessarily limited to a series connection of a single linear response model and a single nonlinear response model illustrated in FIG. 3. Depending on each device, the configuration may be modified into an example of FIG. 4, which is represented by a series connection of a linear response model, a nonlinear response model, and a linear response model. A model in which a linear response model, a nonlinear response model, and a linear response are arranged in parallel with each other may be adopted. In this manner, the order of linearity/nonlinearity and the models are variable depending on each device. Therefore, the response model estimation unit 271 may change internal configurations of the forward characteristic response model 31 and the inverse characteristic response model 32 for each constituent device.

Figure 5:
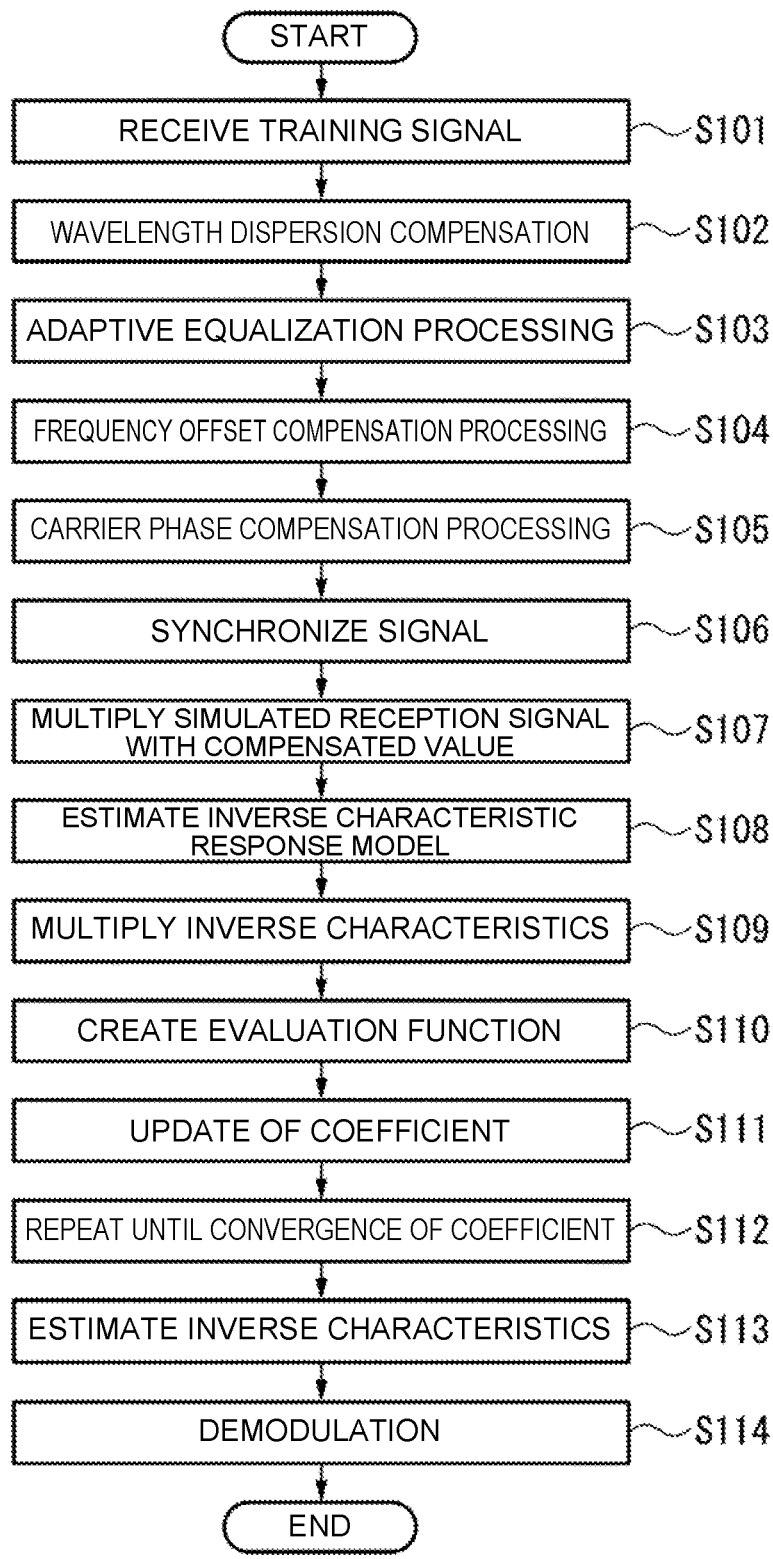
FIG. 5 is a flowchart illustrating the flow of device characteristic estimation processing by an optical reception apparatus according to the first embodiment.

FIG. 5 is a flowchart illustrating the flow of device characteristic estimation processing by the optical reception apparatus 2 according to the first embodiment. The processing of FIG. 5 is executed after the predetermined signal is transmitted from the optical transmission apparatus 1.

The coherent receiver 21 of the optical reception apparatus 2 receives the training signal transmitted from the optical transmission apparatus 1 (step S101). The coherent receiver 21 converts the received training signal into a digital signal and outputs it to the digital signal processing unit 22. The wavelength dispersion compensation unit 23 compensates for wavelength dispersion for respective digital signals output from the coherent receiver 21 (step S102). The wavelength dispersion compensation unit 23 outputs digital signals subjected to the wavelength dispersion compensation to the adaptive equalization unit 24.

The adaptive equalization unit 24 performs adaptive equalization processing to compensate for a distortion generated in the waveform of the digital signal output from the wavelength dispersion compensation unit 23 (step S103). The adaptive equalization processing method is the same as the conventional method, and therefore description thereof will be omitted. The adaptive equalization unit 24 outputs the digital signal subjected to the adaptive equalization processing to the frequency offset compensation unit 25.

The frequency offset compensation unit 25 executes frequency offset compensation processing to compensate for the frequency offset for the digital signal output from the adaptive equalization unit 24 (step S104). The frequency offset compensation processing method is the same as the conventional method, and therefore description thereof will be omitted. The frequency offset compensation unit 25 outputs the digital signal subjected to the frequency offset compensation processing to the carrier phase noise compensation unit 26.

The carrier phase noise compensation unit 26 executes carrier phase compensation processing to compensate the phase offset for the digital signal in which frequency offset has been compensated (step S105). The carrier phase compensation processing method is the same as the conventional method, and therefore description thereof will be omitted. The carrier phase noise compensation unit 26 outputs the signal subjected to the carrier phase compensation processing to the coefficient determination unit 27.

The response model estimation unit 271 of the coefficient determination unit 27 synchronizes the signal by using the digital signal output from the carrier phase noise compensation unit 26 (step S106). It is difficult to synchronize digital signals, if they have not been compensated by the optical reception apparatus 2, due to noises caused by various factors. On the other hand, digital signals having been compensated can be easily synchronized because the influence of noises is suppressed. The response model estimation unit 271 gives compensated wavelength dispersion, distortion, frequency offset, and phase offset to the digital signal compensated after synchronization. That is, the response model estimation unit 271 multiplies the digital signal compensated after synchronization with the compensated wavelength dispersion, distortion, frequency offset, and phase offset (step S107). As a result, using the compensated digital signal, the response model estimation unit 271 generates a simulated reception signal.

Using the generated simulated reception signal, the response model estimation unit 271 estimates forward characteristic response models of the constituent devices. The response model estimation unit 271 estimates the forward characteristics of the constituent devices by using an error back propagation method to optimize the coefficient. Using a model (e.g., an FIR filter or a nonlinear function) that is suitable for each constituent device of the optical transmission system 100, the response model estimation unit 271 models linear and nonlinear response characteristics of respective constituent devices. For example, as illustrated in FIG. 6, using the generated simulated reception signal, the response model estimation unit 271 estimates the forward characteristic response models of respective constituent devices.

Figure 6:
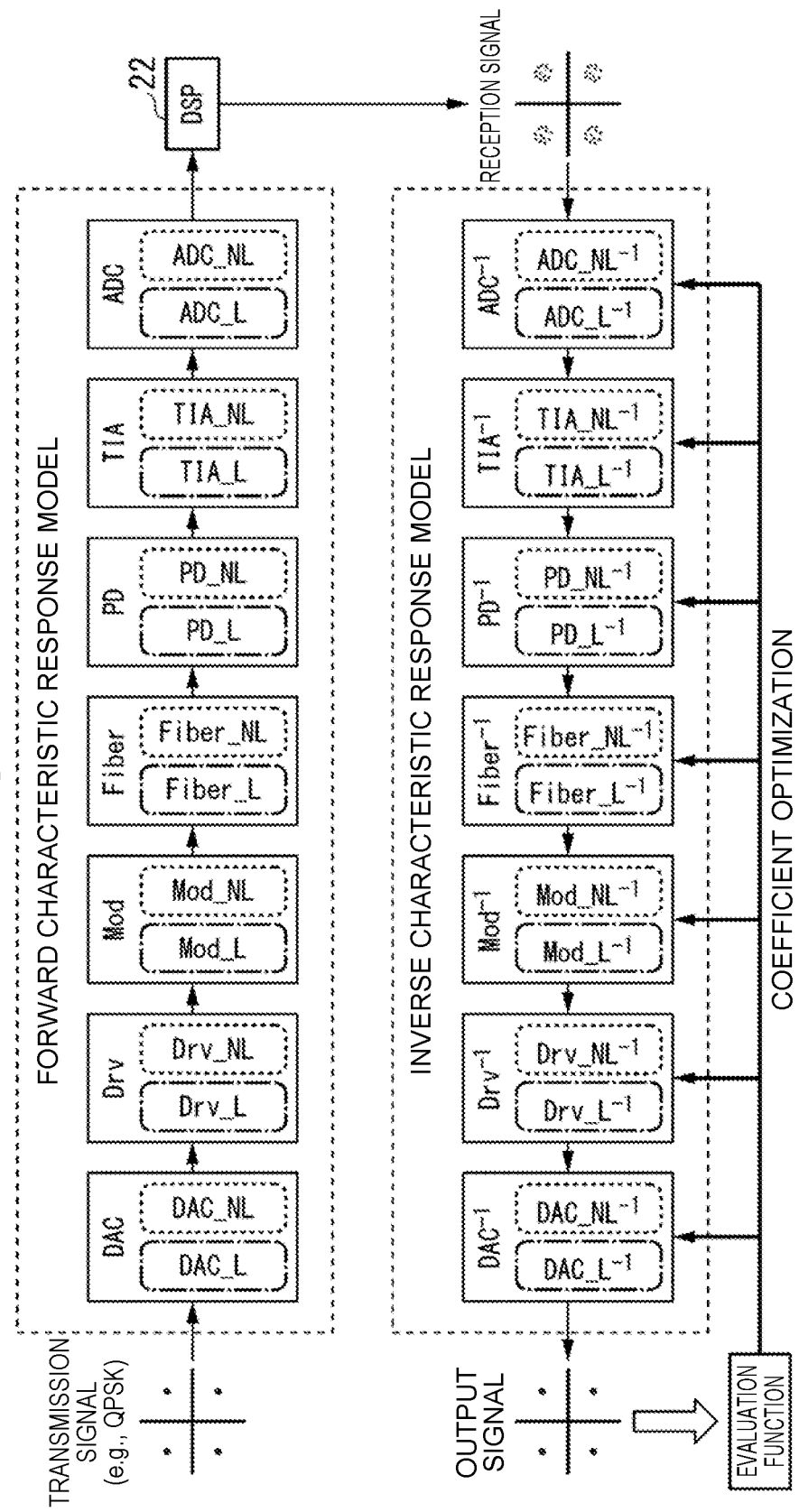
FIG. 6 is a diagram illustrating processing by the optical reception apparatus according to the first embodiment.

FIG. 6 is a diagram illustrating processing by the optical reception apparatus 2 according to the first embodiment. In the example of FIG. 6, forward characteristic response models of DAC, driver amplifier (Drv), modulator (Mod), optical transmission path 3 (Fiber), photodiode (PD), TIA, and ADC are illustrated as forward characteristic response models of respective constituent devices.

Subsequently, using the forward characteristic response models, the response model estimation unit 271 estimates inverse characteristic response models (step S108). In the example of FIG. 6, inverse characteristic response models of $DAC^{-1}$, driver amplifier$^{-1}$ ($Drv^{-1}$), modulator$^{-1}$ ($Mod^{-1}$), optical transmission path$^{-1}$ ($Fiber^{-1}$), photodiode$^{-1}$ ($PD^{-1}$), $TIA^{-1}$, and $ADC^{-1}$ are illustrated as inverse characteristic response models of respective constituent devices.

The coefficient updating unit 272 sets initial values suitable for coefficients to be used in the inverse characteristics of linear response and nonlinear response of respective constituent devices represented by the inverse characteristic response models. The initial values of the coefficients are arbitrary values. For example, the initial values may be set to 0, and coefficients already known by another estimation method, monitoring, or the like can be directly used as the initial values.

The coefficient updating unit 272 gives the inverse characteristics of linear response and nonlinear response of respective constituent devices represented by the inverse characteristic response models to the simulated reception signal generated in the processing of step S107 (step S109). That is, for the simulated reception signal, the coefficient updating unit 272 gives the inverse characteristics of linear response and nonlinear response of respective constituent devices represented by the inverse characteristic response models. As a result, the coefficient updating unit 272 acquires an output signal. The output signal acquired by the coefficient updating unit 272 is a signal assumed to be a predetermined signal (e.g., training signal) transmitted by the optical transmission apparatus 1.

The coefficient updating unit 272 compares the acquired output signal with the training signal acquired in advance, and creates a predetermined evaluation function (step S110). Any evaluation function may be used as the evaluation function. For example, a residual sum of squares given by the following expression (1) or an addition of a regularization term and the residual sum of squares given by the following expression (2) may be used as the evaluation function.

[Math. 1]
$$J = \frac{1}{2}\sum_i |x_i - t_i|^2 \quad (1)$$

[Math. 2]
$$J = \frac{1}{2}\sum_i |x_i - t_i|^2 + \lambda \sum_k \log(\varphi_k - \varphi_{k+1}) \quad (2)$$

In expression (1), J represents the evaluation function, xi represents the simulated reception signal of i-th (i is an integer equal to or greater than 1) sample, and ti represents a correct answer signal of the i-th sample. Further, in expression (2), the second term on the right side is the regularization term, and $\varphi_k$ in the regularization term represents an arbitrary parameter. Adding the regularization term can increase the estimation accuracy of the device response. The regularization term may be an arbitrary function as long as the estimation accuracy of the device response can be increased.

Next, using an optimization algorithm, the coefficient updating unit 272 updates the coefficients to be used for the inverse characteristics so as to minimize the created evaluation function (step S111). A method for optimizing the coefficients one by one or any known method existing in the machine learning field such as the error back propagation method or the steepest descent method may be used as the optimization algorithm.

When the method for optimizing the coefficients one by one is used, the coefficient updating unit 272 performs the following processing [1] to [3].
[1] Optimizing $\varphi_1$ so that the evaluation function can be minimized (while fixing other $\varphi_k$)
[2] Similarly, optimizing $\varphi_2$ to $\varphi_N$ one by one
[3] Optimizing from $\varphi_2$ again, and repeating the processing until all coefficients from $\varphi_1$ to $\varphi_N$ converge
The order of $\varphi_k$ to be optimized may be arbitrary.

When the steepest descent method is used, the coefficient updating unit 272 updates the coefficients based on the following expression (3). Using the steepest descent method enables the coefficient updating unit 272 to simultaneously update all the coefficients, and therefore the estimation time can be shortened. Further, there is a possibility that the estimation accuracy can be improved.

[Math. 3]
$$a_k(t+1) = a_k(t) - \mu \frac{\partial J}{\partial a_k} \quad (3)$$

In expression (3), $a_k$ represents a coefficient to be used for a k-th inverse characteristic response model, and $\mu$ represents a step size. As shown in expression (3), a differentiation of the evaluation function J by $a_k$ is required. Although various differentiation methods are assumed, any method may be used. For example, the error back propagation method (see Reference literature 1, for example) frequently used in the machine learning field, numerical differentiation, or the like can be used to calculate this differentiation.
(Reference literature 1: R. P. Lippmann., "An introduction to computing with neural nets", IEEE ASSP Mag., 4(2) 1987.)

The coefficient updating unit 272 sets the updated coefficients to respective inverse characteristic response models.

Subsequently, using the newly set coefficients, the optical reception apparatus 2 repetitively executes the processing of steps S109 to S111 until the coefficients converge (step S112).

The device characteristic estimation unit 28 acquires the optimized coefficients from the coefficient updating unit 272. Using the acquired optimized coefficients, the device characteristic estimation unit 28 estimates inverse characteristics of linear response and nonlinear response of respective constituent devices (step S113). Specifically, the device characteristic estimation unit 28 estimates the inverse characteristics by setting the optimized coefficients to respective inverse characteristic response models.

The device characteristic estimation unit 28 compensates for the device response by giving the estimated inverse characteristics of linear response and nonlinear response of respective constituent devices to the simulated reception signal output from the coefficient determination unit 27. The device characteristic estimation unit 28 outputs the digital signal compensated in device response to the demodulation unit 29. The demodulation unit 29 acquires a demodulation signal by demodulating and decoding the digital signal output from the device characteristic estimation unit 28.

The optical transmission system 100 having the above-described configuration can easily estimate response characteristics of respective devices configuring the transmission path between the optical transmission apparatus and the optical reception apparatus. Specifically, the optical reception apparatus 2 includes the coefficient determination unit 27 configured to optimize, based on the simulated reception signal, the coefficients to be used to compensate for deterioration according to the characteristics of respective constituent devices configuring the transmission path between the optical transmission apparatus 1 and the optical reception apparatus 2, and the device characteristic estimation unit 28 configured to estimate the characteristics of respective constituent devices by using the optimized coefficients. The coefficient determination unit 27 estimates the inverse characteristic response models of respective constituent devices, and optimizes the coefficients to be used in the linear response and nonlinear response represented by the inverse characteristic response models. The device characteristic estimation unit 28 estimates the inverse characteristics of linear response and nonlinear response of respective constituent devices by using the optimized coefficients for the linear response and nonlinear response represented by the inverse characteristic response models. In this manner, the optical transmission system 100 can estimate the linear and nonlinear response characteristics of respective devices without taking out the transmission side devices provided in the optical transmission apparatus 1 and the reception side devices provided in the optical reception apparatus 2, or without disassembling the optical transmission apparatus 1 and the optical reception apparatus 2. Therefore, the response characteristics of respective devices configuring the transmission path between the optical transmission apparatus and the optical reception apparatus can be easily estimated.

Modified Example of First Embodiment

The above-described embodiment has showed the configuration in that the optical transmission apparatus 1 transmits the training signal, as the predetermined signal, to the optical reception apparatus 2 and the optical reception apparatus 2 optimizes the coefficients by using the simulated reception signal obtained by the training signal. The optical reception apparatus 2 may be configured so as to optimize the coefficients by another method not using the training signal. Hereinafter, two patterns will be described.

Another Coefficient Optimization Method (I)

The optical transmission apparatus 1 transmits an arbitrary signal (which may be a signal in operation, for example) other than the training signal to the optical reception apparatus 2. The optical reception apparatus 2 receives the arbitrary signal transmitted from the optical transmission apparatus 1, which is other than the training signal. Then, the optical reception apparatus 2 executes the processing illustrated in FIG. 5 by using the received signal. The optical reception apparatus 2 may use, as the signal to be compared with the output signal, a signal not yet decoded by the demodulation unit 29, or a signal obtained by symbol-mapping the decoded bit again.

Another Coefficient Optimization Method (II)

If the quality is high enough for enabling signal communication at the start of estimation, the coefficients can be optimized by any of the above-described methods. On the other hand, when a device nonlinear area to be used is a strong nonlinear area, there may be no signal communication at the start of estimation in some cases. In such a case, repetitively performing the estimation/compensation makes it possible to estimate and compensate for the device characteristics in the nonlinear area to be used. Specific processing will be described below.

The optical reception apparatus 2 causes the constituent devices to operate in a weak nonlinear area enough for enabling signal communication (step 1). Subsequently, the optical reception apparatus 2 estimates the device characteristics by the coefficient optimization method described in the above embodiment or another coefficient optimization method (I) (step 2). Using the obtained characteristics of the constituent devices, the optical reception apparatus 2 compensates for the device characteristics (step 3). As a result, the optical reception apparatus 2 obtains a higher signal quality than at the start of processing. Subsequently, to the extent enough for enabling signal communication, the optical reception apparatus 2 causes the constituent devices to operate in a stronger nonlinear area than the previous time (step 4). The optical reception apparatus 2 repetitively performs the processing of step 2 to step 4 until the coefficients converge.

The above-described embodiment has showed the configuration in which the optical reception apparatus 2 compensates for the device response by using the estimated characteristics. Alternatively, information on the characteristics estimated in the optical reception apparatus 2 may be notified to the optical transmission apparatus 1 by some method, and the optical transmission apparatus 1 may be configured to compensate for the device response by using the notified information on the characteristics.

Some devices have the capability of changing their characteristics such as the central frequency of an optical filter, the tilt of an optical amplifier, and the oscillation frequency of a laser). Therefore, the device characteristic estimation unit 28 may be configured to change, for each device having changeable characteristics, the characteristics by feeding back information on estimated characteristics.

As a result, compensating for the device response is feasible by a method different from that of the above embodiment.

The estimation of the device characteristics may be performed by on-line processing with the coefficient determination unit 27 and the device characteristic estimation unit 28 physically provided in a chip configuring the digital signal processing unit 22 in the optical reception apparatus 2 as in the above-described embodiment, or may be performed by off-line processing with the reception signal taken out from the optical reception apparatus 2. When the off-line processing is performed, all the functional units provided in the digital signal processing unit 22 or the coefficient determination unit 27 and the device characteristic estimation unit 28 are provided in an external device such as an external computer. When all the functional units provided in the digital signal processing unit 22 are provided in an external device, the external device acquires the signal immediately entering the wavelength dispersion compensation unit 23 and performs the processing of FIG. 5. When the coefficient determination unit 27 and the device characteristic estimation unit 28 provided in the digital signal processing unit 22 are provided in an external device, the external device acquires the signal output from the carrier phase noise compensation unit 26 and performs the processing of steps S106 to S113 illustrated in FIG. 5.

Second Embodiment

The first embodiment has showed the configuration in which the optical reception apparatus estimates the characteristics of constituent devices and compensates for the device response based on the estimated characteristics of the constituent devices. In the second embodiment, a configuration in which the optical transmission apparatus estimates the characteristics of constituent devices and compensates for the device response based on the estimated characteristics of the constituent device will be described.

Figure 7:
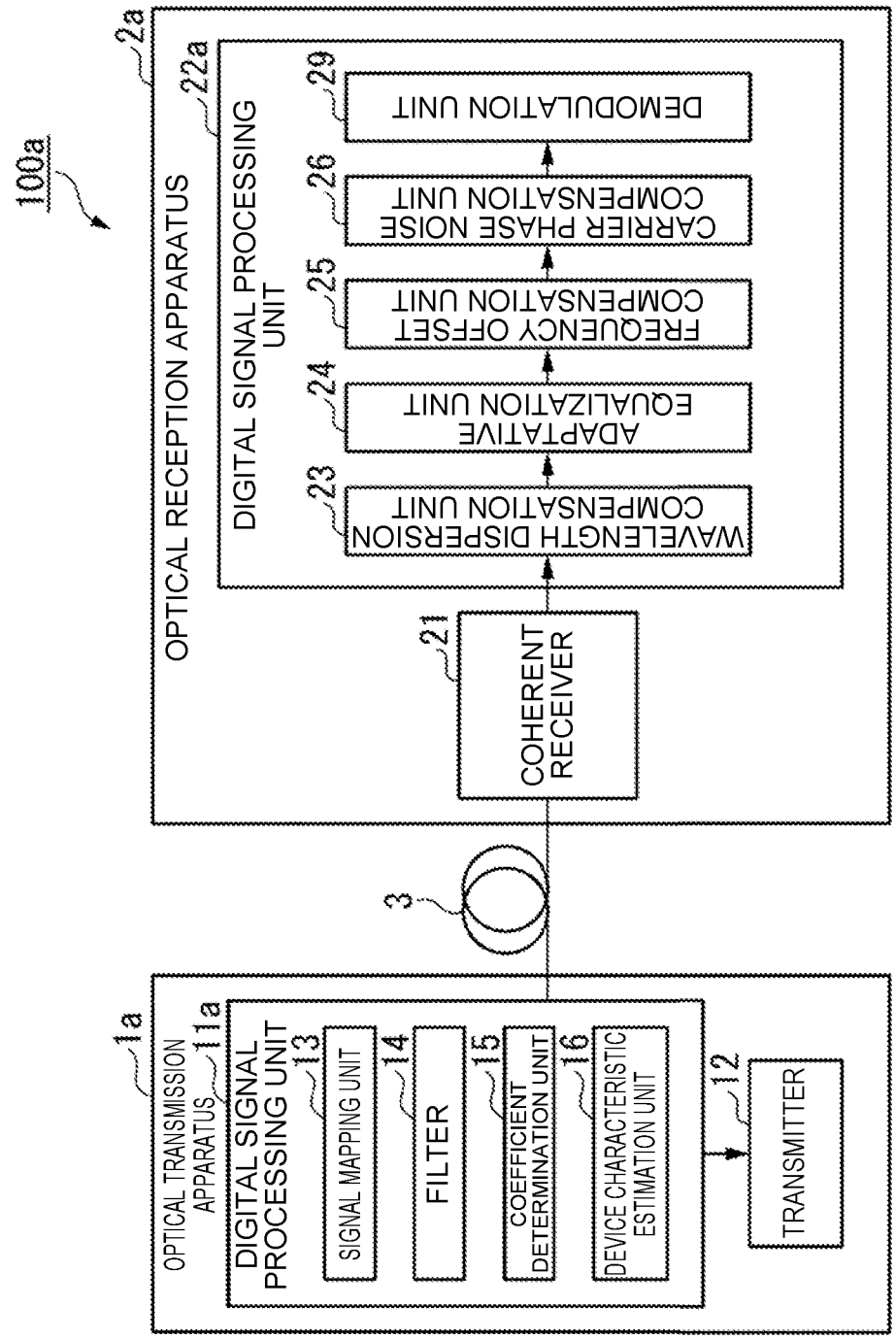
FIG. 7 is a diagram illustrating a system configuration of an optical transmission system according to a second embodiment.

FIG. 7 is a diagram illustrating a system configuration of an optical transmission system 100a according to the second embodiment. The optical transmission system 100a includes an optical transmission apparatus 1a and an optical reception apparatus 2a. The optical transmission apparatus 1a and the optical reception apparatus 2a are communicably connected via the optical transmission path 3.

The optical transmission apparatus 1a in the second embodiment is different in configuration from the optical transmission apparatus 1 in that a coefficient determination unit 15 and a device characteristic estimation unit 16 are newly provided in the digital signal processing unit 11. The optical reception apparatus 2a in the second embodiment is different in configuration from the optical reception apparatus 2 in that the coefficient determination unit 27 and the device characteristic estimation unit 28 are not provided in a digital signal processing unit 22a.

Figure 8:
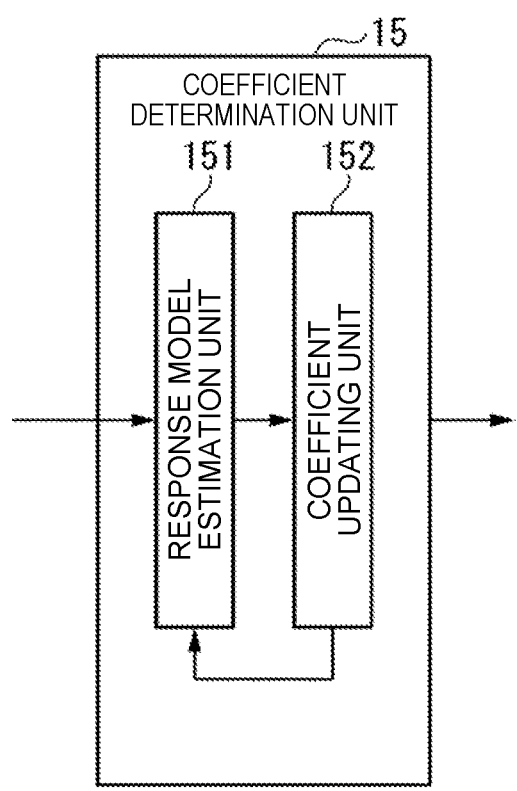
FIG. 8 is a diagram illustrating an internal configuration of a coefficient determination unit according to the second embodiment.

The coefficient determination unit 15 optimizes, based on a reception signal obtained from the optical reception apparatus 2a, coefficients to be used to compensate for deterioration according to characteristics of respective constituent devices. The coefficient determination unit 15 is configured, as illustrated in FIG. 8, by a response model estimation unit 151 and a coefficient updating unit 152. FIG. 8 is a diagram illustrating an internal configuration of the coefficient determination unit 15 according to the second embodiment.

The response model estimation unit 151 estimates, based on the reception signal obtained from the optical reception apparatus 2a, forward characteristic response models of linear response and nonlinear response for respective constituent devices. The reception signal obtained from the optical reception apparatus 2a is a reception signal taken out from the optical reception apparatus 2a by some method and input to the optical transmission apparatus 1a. Here, the reception signal taken out from the optical reception apparatus 2a is a signal output from the coherent receiver 21.

The coefficient updating unit 152 optimizes the coefficients in such a manner that an evaluation function relating to an output signal obtained by using the forward characteristic response models and the transmission signal becomes equal to or greater than a predetermined threshold. For example, the coefficient updating unit 152 creates the evaluation function by comparing the output signal with a predetermined signal transmitted by the optical transmission apparatus 1a and optimizes the coefficients by updating the coefficients so as to minimize the evaluation function. Here, the predetermined signal transmitted by the optical transmission apparatus 1a is a training signal. The coefficient updating unit 152 acquires the output signal by giving, to the predetermined signal, the linear and nonlinear response characteristics of respective constituent devices represented by the forward characteristic response models.

Using the optimized coefficients, the device characteristic estimation unit 16 estimates inverse characteristics of linear response and nonlinear response of respective constituent devices. The inverse characteristics of linear response and nonlinear response of respective constituent devices estimated by the device characteristic estimation unit 16 have inverse characteristics of forward characteristics of linear response and nonlinear response of respective constituent devices. The device characteristic estimation unit 16 compensates for the device response by giving the inverse characteristics of linear response and nonlinear response of respective constituent devices to the reception signal output from the coefficient determination unit 15.

Figure 9:
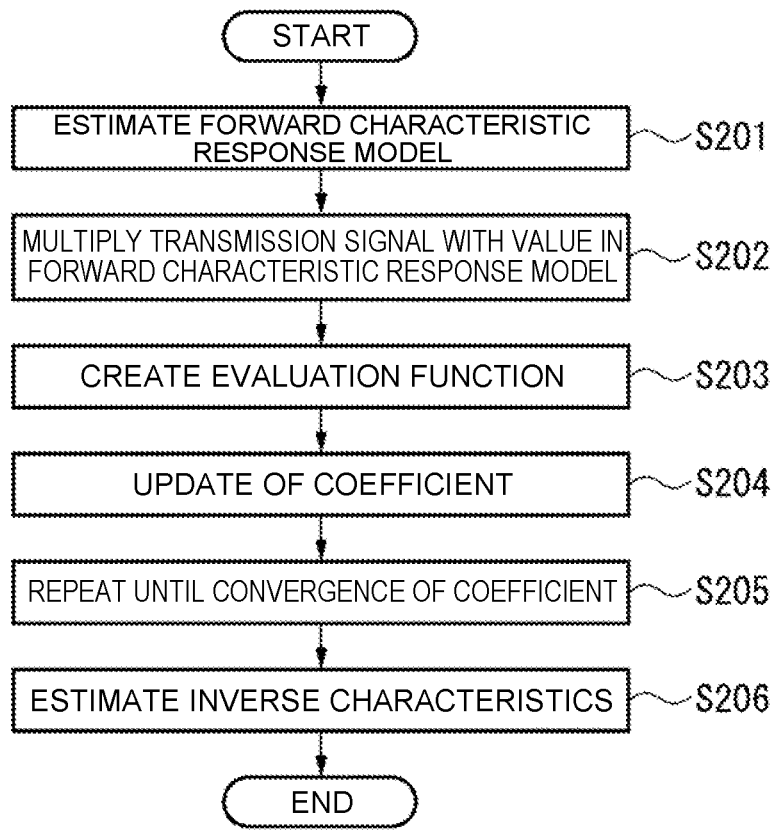
FIG. 9 is a flowchart illustrating the flow of device characteristic estimation processing by an optical transmission apparatus according to the second embodiment.

FIG. 9 is a flowchart illustrating the flow of device characteristic estimation processing by the optical transmission apparatus 1a according to the second embodiment. The processing of FIG. 9 is executed after the reception signal is input into the optical transmission apparatus 1a.

Using the input reception signal, the response model estimation unit 151 estimates the forward characteristic response models (step S201). As a result, the response model estimation unit 151 models the linear and nonlinear response characteristics of respective constituent devices. For example, as illustrated in FIG. 10, using the input reception signal, the response model estimation unit 151 estimates the forward characteristic response models of respective constituent devices.

Figure 10:
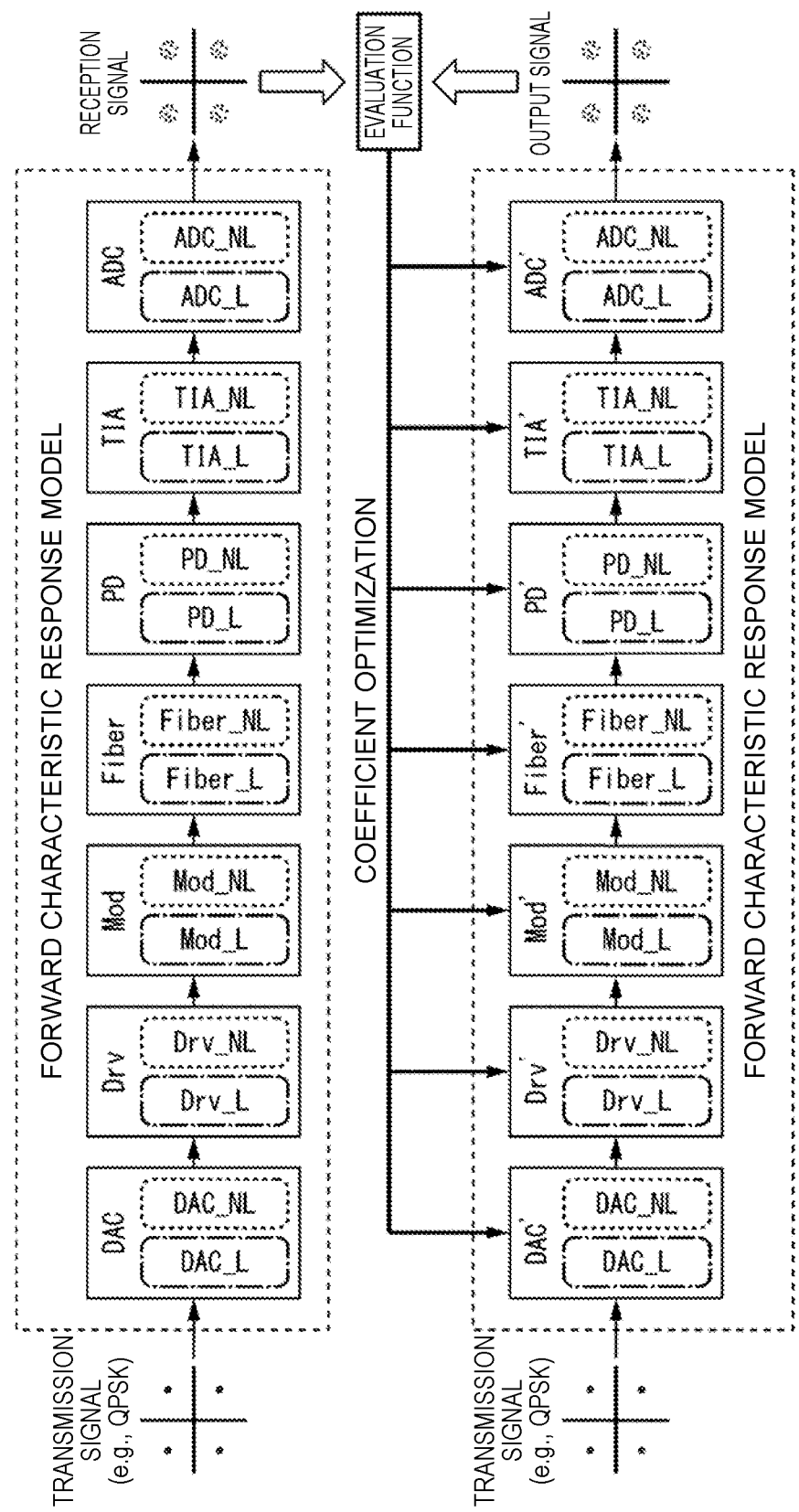
FIG. 10 is a diagram illustrating processing by the optical transmission apparatus according to the second embodiment.

FIG. 10 is a diagram illustrating processing by the optical transmission apparatus 1a according to the second embodiment. In the example of FIG. 10, forward characteristic response models of DAC, driver amplifier (Drv), modulator (Mod), optical transmission path 3 (Fiber), photodiode (PD), TIA, and ADC are illustrated as forward characteristic response models of respective constituent devices.

The coefficient updating unit 152 sets initial values suitable for the coefficients to be used in the linear and nonlinear response characteristics of respective constituent devices represented by the forward characteristic response models. The initial values of the coefficients are arbitrary values. For example, the initial values may be set to 0, and coefficients already known by another estimation method, monitoring, or the like can be directly used as the initial values.

The coefficient updating unit 152 gives, to the transmission signal, the linear and nonlinear response characteristics of respective constituent devices represented by the forward characteristic response models (step S202). That is, the coefficient updating unit 152 multiplies the transmission signal with the linear and nonlinear response characteristics of respective constituent devices represented by the forward characteristic response models. As a result, the coefficient updating unit 152 acquires an output signal. The output signal acquired by the coefficient updating unit 152 is a signal assumed to be the signal received by the optical reception apparatus 2a.

The coefficient updating unit 152 creates the predetermined evaluation function by comparing the acquired output signal with the training signal acquired in advance (step S203). For example, the coefficient updating unit 152 uses the above-described expression (1) or (2). Next, using an optimization algorithm, the coefficient updating unit 152 updates the coefficients to be used for the inverse characteristics so as to minimize the created evaluation function (step S204). The coefficient updating unit 152 uses any method described in the first embodiment as the optimization algorithm.

The coefficient updating unit 152 sets the updated coefficients to respective forward characteristic response models. Subsequently, using the newly set coefficients, the optical transmission apparatus 1a repetitively executes the processing of steps S202 to S204 until the coefficients converge (step S205). The device characteristic estimation unit 16 acquires the optimized coefficients from the coefficient updating unit 152. Using the acquired optimized coefficients, the device characteristic estimation unit 16 estimates the inverse characteristics of linear response and nonlinear response of respective constituent devices (step S206). Specifically, first, the device characteristic estimation unit 16 estimates the forward characteristics of respective constituent devices by setting the optimized coefficients to respective forward characteristic response models. Subsequently, the device characteristic estimation unit 16 estimates the inverse characteristics by estimating inverse characteristics of the forward characteristics of respective constituent devices.

The optical transmission system 100a having the above-described configuration can easily estimate response characteristics of respective devices configuring the transmission path between the optical transmission apparatus and the optical reception apparatus. Specifically, the optical transmission apparatus 1a includes the coefficient determination unit 15 configured to optimize, based on the reception signal, the coefficients to be used to compensate for deterioration according to characteristics of respective constituent devices, and the device characteristic estimation unit 16 configured to estimate the characteristics of respective constituent devices by using the optimized coefficient. The coefficient determination unit 15 estimates the forward characteristic response models of linear response and nonlinear response of respective constituent devices, and optimizes the coefficients to be used in the linear response and nonlinear response represented by the forward characteristic response models. The device characteristic estimation unit 16 estimates the forward characteristics of linear response and nonlinear response of respective constituent devices by using the optimized coefficients for the linear response and nonlinear response represented by the forward characteristic response models. Then, the device characteristic estimation unit 16 estimates the inverse characteristics of linear response and nonlinear response of respective constituent devices by estimating inverse characteristics of the estimated forward characteristics. In this manner, it is possible to estimate the linear and nonlinear response characteristics of respective devices, without taking out the transmission side devices provided in the optical transmission apparatus 1a and the reception side devices provided in the optical reception apparatus 2a, or without disassembling the optical transmission apparatus 1a and the optical reception apparatus 2a. Therefore, the response characteristics of respective devices configuring the transmission path between the optical transmission apparatus and the optical reception apparatus can be easily estimated.

Modified Example According to Second Embodiment

The above-described embodiment has showed the configuration in which the optical transmission apparatus 1a transmits the training signal, as the predetermined signal, to the optical reception apparatus 2a and further the optical reception apparatus 2a optimizes the coefficients by using the received reception signal. The optical transmission apparatus 1a may be configured so as to optimize the coefficients by another method not using the training signal. Hereinafter, two patterns will be described.

Another Coefficient Optimization Method (I)

The optical transmission apparatus 1a transmits an arbitrary signal (which may be a signal in operation, for example) other than the training signal to the optical reception apparatus 2a. The optical reception apparatus 2a receives the arbitrary signal transmitted from the optical transmission apparatus 1a, which is other than the training signal. The reception signal output from the coherent receiver 21 of the optical reception apparatus 2a is a reception signal taken out from the optical reception apparatus 2a by some method and input to the optical transmission apparatus 1a. Then, using the input reception signal, the optical transmission apparatus 1a executes the processing of FIG. 9.

Another Coefficient Optimization Method (II)

If the quality is high enough for enabling signal communication at the start of estimation, the coefficients can be optimized by any of the above-described methods. On the other hand, when a device nonlinear area to be used is a strong nonlinear area, there may be no signal communication at the start of estimation in some cases. In such a case, repetitively performing the estimation/compensation makes it possible to estimate and compensate for the device characteristics in the nonlinear area to be used. Specific processing will be described below.

The optical transmission apparatus 1a causes the constituent devices to operate in a weak nonlinear area enough for enabling signal communication (step 11). Subsequently, the optical transmission apparatus 1a estimates the device characteristics by the coefficient optimization method described in the above embodiment or another coefficient optimization method (I) (step 12). Using the obtained characteristics of the constituent devices, the optical transmission apparatus 1a compensates for the device characteristics (step 13). As a result, the optical transmission apparatus 1a obtains a higher signal quality than at the start of processing. Subsequently, to the extent enough for enabling signal communication, the optical transmission apparatus 1a causes the constituent devices to operate in a stronger nonlinear area than the previous time (step 14). The optical transmission apparatus 1a repetitively performs the processing of step 12 to step 14 until the coefficients converge.

The estimation of the device characteristics may be performed by on-line processing with the coefficient determination unit 15 and the device characteristic estimation unit 16 physically provided in a chip configuring the digital signal processing unit 11a in the optical transmission apparatus 1a as in the above-described embodiment, or may be performed by off-line processing with the reception signal taken out from the optical reception apparatus 2. When the off-line processing is performed, the coefficient determination unit 15 and the device characteristic estimation unit 16 are provided in an external device such as an external computer. When the coefficient determination unit 15 and the device characteristic estimation unit 16 are provided in an external device, the external device acquires the signal output from the coherent receiver 21 and performs the processing of steps S201 to 206 illustrated in FIG. 9.

A part of functional units of the optical transmission apparatuses 1 and 1a and the optical reception apparatuses 2 and 2a described above may be realized by a computer. In such a case, a program for realizing the above functions may be recorded in a computer-readable recording medium, and the program recorded in this recording medium may be read by a computer system to execute processing for realizing the functions. Here, it is assumed that the "computer system" includes hardware such as OS and peripheral equipment. Further, the "computer-readable recording medium" is, for example, a portable medium such as a flexible disk, a magneto-optical disk, a ROM, or a CD-ROM, or a storage device incorporated in the computer system such as a hard disk drive. Further, the "computer-readable recording medium" may include those that dynamically hold the program for a short period of time, like a communication line when the program is transmitted via a network such as the Internet or a communication line such as a telephone line, or those that hold the program for a predetermined time, like a volatile memory provided in a computer system serving as a server or a client in such cases. Further, the above-described program may be for realizing a part of the above-described functions, or may be realized in combination with any program already recorded in the computer system to realize the above-described functions. Moreover, it may be realized by using a programmable logic device such as FPGA (Field Programmable Gate Array).

Although some embodiments of the present invention have been described in detail with reference to the attached drawings, specific configurations are not limited to these embodiments and should encompass designs and the like within a range that does not deviate from the gist of the present invention.

INDUSTRIAL APPLICABILITY

The present invention is applicable to optical transmission systems.

REFERENCE SIGNS LIST 1, 1a Optical transmission apparatus
2, 2a Optical reception apparatus
11, 11a Digital signal processing unit
12 Transmitter
13 Signal mapping unit
14 Filter
15 Coefficient determination unit
16 Device characteristic estimation unit
21 Coherent receiver
22, 22a Digital signal processing unit
23 Wavelength dispersion compensation unit
24 Adaptive equalization unit
25 Frequency offset compensation unit
26 Carrier phase noise compensation unit
27 Coefficient determination unit
28 Device characteristic estimation unit
29 Demodulation unit
151 Response model estimation unit
152 Coefficient updating unit 271 Response model estimation unit
272 Coefficient updating unit

The invention claimed is:

1. An optical transmission system that includes an optical transmission apparatus and an optical reception apparatus, the optical transmission system comprising:
a coefficient determination unit configured to optimize, based on a reception signal received by the optical reception apparatus, a coefficient to be used to compensate for deterioration according to characteristics of each device and thereby configuring a transmission path between the optical transmission apparatus and the optical reception apparatus; and
a device characteristic estimation unit configured to estimate the characteristics of each device by using the optimized coefficient, wherein when the coefficient determination unit is provided in the optical reception apparatus, the coefficient determination unit estimates, for each device configuring the transmission path, an inverse characteristic response model of linear response and nonlinear response based on the reception signal, and optimizes the coefficient so that an evaluation function relating to an output signal obtained by using the inverse characteristic response model and the reception signal becomes equal to or greater than a predetermined threshold.

2. The optical transmission system according to claim 1, wherein the coefficient determination unit acquires the output signal by giving, to the reception signal, inverse characteristics of each device represented by the inverse characteristic response model.

3. The optical transmission system according to claim 1, wherein the coefficient determination unit creates the evaluation function by comparing the output signal with a predetermined signal transmitted by the optical transmission apparatus, and updates the coefficient so as to minimize the evaluation function.

4. The optical transmission system according to claim 1, wherein
the device characteristic estimation unit is provided in the optical transmission apparatus or the optical reception apparatus,
when the device characteristic estimation unit is provided in the optical transmission apparatus, the device characteristic estimation unit is arranged in front of a device configuring the transmission path in the optical transmission apparatus, and
when the device characteristic estimation unit is provided in the optical reception apparatus, the device characteristic estimation unit is arranged behind a device configuring the transmission path in the optical reception apparatus.

5. The optical transmission system according to claim 1, wherein the device characteristic estimation unit estimates the characteristics of each device by using the optimized coefficient, and feeds back an estimation result to a device having changeable characteristics.

6. A characteristic estimation method for an optical transmission system including an optical transmission apparatus and an optical reception apparatus, the characteristic estimation method comprising:
a coefficient updating step of optimizing, based on a reception signal received by the optical reception apparatus, a coefficient to be used to compensate for deterioration according to characteristics of each device configuring a transmission path between the optical transmission apparatus and the optical reception apparatus, and
a device characteristic estimation step of estimating the characteristics of each device by using the optimized coefficient,
wherein when the coefficient updating step is provided in the optical reception apparatus, the coefficient updating step estimates, for each device configuring the transmission path, an inverse characteristic response model of linear response and nonlinear response based on the reception signal, and optimizes the coefficient so that an evaluation function relating to an output signal obtained by using the inverse characteristic response model and the reception signal becomes equal to or greater than a predetermined threshold.

7. The characteristic estimation method according to claim 6, wherein the coefficient updating step acquires the output signal by giving, to the reception signal, inverse characteristics of each device represented by the inverse characteristic response model.

8. The characteristic estimation method according to claim 6, wherein the coefficient updating step creates the evaluation function by comparing the output signal with a predetermined signal transmitted by the optical transmission apparatus, and updates the coefficient so as to minimize the evaluation function.

9. The characteristic estimation method according to claim 6, wherein
the device characteristic estimation step is provided in the optical transmission apparatus or the optical reception apparatus,
when the device characteristic estimation step is provided in the optical transmission apparatus, the device characteristic estimation step is completed before a device configuring the transmission path in the optical transmission apparatus, and
when the device characteristic estimation step is provided in the optical reception apparatus, the device characteristic estimation step is completed after a device configuring the transmission path in the optical reception apparatus.

10. The characteristic estimation method according to claim 6, wherein the device characteristic estimation step estimates the characteristics of each device by using the optimized coefficient, and feeds back an estimation result to a device having changeable characteristics.

11. An optical transmission system that includes an optical transmission apparatus and an optical reception apparatus, the optical transmission system comprising:
a coefficient determination unit configured to optimize, based on a reception signal received by the optical reception apparatus, a coefficient to be used to compensate for deterioration according to characteristics of each device and thereby configuring a transmission path between the optical transmission apparatus and the optical reception apparatus; and
a device characteristic estimation unit configured to estimate the characteristics of each device by using the optimized coefficient, wherein when the coefficient determination unit is provided in the optical reception apparatus, the coefficient determination unit estimates, for each device configuring the transmission path, a characteristic response model of linear response and nonlinear response based on the reception signal, and optimizes the coefficient so that an evaluation function relating to an output signal obtained by using an inverse characteristic response model and the reception signal becomes equal to or greater than a predetermined threshold.

12. The optical transmission system according to claim 11, wherein the coefficient determination unit acquires the output signal by giving, to the reception signal, inverse characteristics of each device represented by the inverse characteristic response model.

13. The optical transmission system according to claim 11, wherein the coefficient determination unit creates the evaluation function by comparing the output signal with a predetermined signal transmitted by the optical transmission apparatus, and updates the coefficient so as to minimize the evaluation function.

14. The optical transmission system according to claim 11, wherein
the device characteristic estimation unit is provided in the optical transmission apparatus or the optical reception apparatus,
when the device characteristic estimation unit is provided in the optical transmission apparatus, the device characteristic estimation unit is arranged in front of a device configuring the transmission path in the optical transmission apparatus, and
when the device characteristic estimation unit is provided in the optical reception apparatus, the device characteristic estimation unit is arranged behind a device configuring the transmission path in the optical reception apparatus.

15. The optical transmission system according to claim 11, wherein the device characteristic estimation unit estimates the characteristics of each device by using the optimized coefficient, and feeds back an estimation result to a device having changeable characteristics.

\* \* \* \* \*